United States Patent
Sato et al.

(10) Patent No.: US 7,814,119 B2
(45) Date of Patent: Oct. 12, 2010

(54) CONTROL OF DATA LINKABILITY

(75) Inventors: Yoshinori Sato, Sagamihara (JP); Toyohisa Morita, Tokyo (JP); Hideyuki Maki, Kamakura (JP); Takashi Fukumoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 361 days.

(21) Appl. No.: 11/080,641

(22) Filed: Mar. 16, 2005

(65) Prior Publication Data

US 2005/0283621 A1 Dec. 22, 2005

(30) Foreign Application Priority Data

Mar. 19, 2004 (JP) .............................. 2004-079453

(51) Int. Cl.
G06F 7/00 (2006.01)
G06F 17/30 (2006.01)
G06F 7/04 (2006.01)
G06F 15/16 (2006.01)
H04L 29/06 (2006.01)

(52) U.S. Cl. ............................ 707/781; 707/705; 726/5; 726/4; 726/3; 726/2; 709/203; 709/201

(58) Field of Classification Search ....................... 707/1, 707/9, 781, 705; 726/2–5; 709/203, 201
See application file for complete search history.

(56) References Cited

U.S. PATENT DOCUMENTS 5,862,325 A * 1/1999 Reed et al. ................. 709/201
5,923,842 A * 7/1999 Pedersen et al. ................ 726/8
5,961,593 A * 10/1999 Gabber et al. ................ 709/219
6,463,533 B1 * 10/2002 Calamera et al. ............ 713/163
6,711,682 B1 * 3/2004 Capps ......................... 713/184
6,738,808 B1 * 5/2004 Zellner et al. ................ 709/223

(Continued)

FOREIGN PATENT DOCUMENTS

JP 2001-357130 12/2001

(Continued)

OTHER PUBLICATIONS

Udi Manber, "Introduction to Algorithms, A Creative Approach", 1989, Addison-Wesley, p. 80.*

Primary Examiner—Brent Stace
(74) Attorney, Agent, or Firm—Antonelli, Terry, Stout & Kraus, LLP.

(57) ABSTRACT

In the conventional technique for mainly performing access control, an entity (an individual) which provides information cannot grasp a state of use of personal information. In the conventional technique for encrypting stored data, a decryption key is always required when personal data is used and the personal data is not protected once decrypted. The invention constitute a system such that a purchase history is collected according to an anonymous ID and a response from a member card or an agent server is required for operation for associating the anonymous ID with a personal ID. Personal data itself is not encrypted but stored in a plain text with the personal ID and the anonymous ID as keys such that the anonymous ID is regenerated every time the anonymous ID is associated with the personal ID on a server side. At this point, the anonymous ID serving as a collection key for the purchase history, which is accumulated concurrently, is also regenerated.

7 Claims, 14 Drawing Sheets

U.S. PATENT DOCUMENTS

| | | | |
|---|---|---|---|
| 7,103,660 B2 * | 9/2006 | Nakamura | 709/225 |
| 7,203,315 B1 * | 4/2007 | Livesay | 380/255 |
| 7,472,423 B2 * | 12/2008 | DeCenzo et al. | 726/26 |
| 7,630,927 B2 * | 12/2009 | Canard et al. | 705/35 |
| 7,640,187 B1 * | 12/2009 | Sonderegger et al. | 705/26 |
| 2001/0054155 A1 * | 12/2001 | Hagan et al. | 713/193 |
| 2002/0002545 A1 * | 1/2002 | Resneck | 705/74 |
| 2002/0099824 A1 * | 7/2002 | Bender et al. | 709/225 |
| 2003/0065562 A1 * | 4/2003 | Matsui et al. | 705/14 |

FOREIGN PATENT DOCUMENTS

| | | | |
|---|---|---|---|
| WO | 02/888895 | * | 11/2002 |

* cited by examiner

| PERSONAL ID (305) | DM SEND OUT (307) | SEPARATE ANALYSIS (308) | STATISTICS ANALYSIS (309) | ... (319) |
|---|---|---|---|---|
| 1000 | OK | OK | OK | ... |

321

301

| ANONYMOUS ID (306) | DM SEND OUT (307) | SEPARATE ANALYSIS (308) | STATISTICS ANALYSIS (309) | ... |
|---|---|---|---|---|
| A1001 | OK | OK | OK | ... |

320

302

| ANONYMOUS ID (306) | DM SEND OUT (307) | SEPARATE ANALYSIS (308) | STATISTICS ANALYSIS (309) | ... |
|---|---|---|---|---|
| A1001 | OK | OK | OK | ... |
| A2001 | OK | NG | OK | ... |
| A3001 | NG | NG | NG | ... |
| ... | ... | ... | ... | ... |

303

| PERSONAL ID (305) | NAME (310) | ADDRESS (311) | AGE (312) | ... |
|---|---|---|---|---|
| 1000 | SUZUKI | TOKYO... | 20 | ... |
| 2000 | SATO | KANAGAWA... | 35 | ... |
| 3000 | TAKAHASHI | KANAGAWA... | 40 | ... |
| ... | ... | ... | ... | ... |

304

| ANONYMOUS ID (306) | DATE OF PURCHASE (313) | COMMODITY OF PURCHASE (314) | PRICE (315) |
|---|---|---|---|
| A1001 | 2004/4/1 | VEGETABLE | 500 |
| A1001 | 2004/4/1 | MEAT | 1000 |
| A2001 | 2004/4/2 | DAIRY PRODUCTS | 1000 |
| A2001 | 2004/4/5 | FISH | 800 |
| A1001 | 2004/4/15 | POINT | -1500 |
| ... | ... | ... | ... |

322

316

| ANONYMOUS ID (306) | DATE OF USAGE (317) | PURPOSE OF USAGE (318) | ... |
|---|---|---|---|
| A1001 | 2004/5/1 | DM SEND OUT | ... |
| ... | ... | ... | ... |

| ANONYMOUS ID (306) | TOTAL POINT (404) | USED POINT (405) | ADDITIONAL POINT (406) |
|---|---|---|---|
| A1001 | 2000 | 0 | 500 |
| ... | ... | ... | ... |

402

| PERSONAL ID (305) | NAME (313) | ADDRESS (314) | MEET SCORE (407) | ... |
|---|---|---|---|---|
| 1000 | SUZUKI | TOKYO ... | 100 | ... |
| 2000 | SATO | KANAGAWA ... | 80 | ... |
| ... | ... | ... | ... | ... |

| ANONYMOUS ID (306) | DM SEND OUT (307) | SEPARATE ANALYSIS (308) | STATISTICS ANALYSIS (309) | TERM OF VALIDITY (903) | ... |
|---|---|---|---|---|---|
| A1001 | OK | OK | OK | 2005/3/31 | ... |

901

| ANONYMOUS ID (306) | DM SEND OUT (310) | SEPARATE ANALYSIS (311) | STATISTICS ANALYSIS (312) | TERM OF VALIDITY (904) | ... |
|---|---|---|---|---|---|
| A1001 | OK | OK | OK | 2005/3/31 | ... |
| A2001 | OK | NG | OK | 2005/3/31 | ... |
| A3001 | NG | NG | NG | 2004/9/31 | ... |
| ... | ... | ... | ... | ... | ... |

CONTROL OF DATA LINKABILITY

CLAIM OF PRIORITY

The present application claims priority from Japanese application P2004-079453 filed on Mar. 19, 2004 and Japanese application P2004-331334 filed on Nov. 16, 2004, the contents of which are hereby incorporated by reference into this application.

FIELD OF THE INVENTION

The present invention relates to a database system that handles data with high confidentiality such as electronic personal information, medical information, and official documents.

BACKGROUND OF THE INVENTION

Eight principles concerning protection of privacy are presented by the recommendation "OECD RECOMMENDATION CONCERNING AND GUIDELINES GOVERNING THE PROTECTION OF PRIVACY AND TRANSBORDER FLOWS OF PERSONAL DATA" adopted by the Organization for Economic Co-operation and Development (OECD) in 1980. The eight principles of the OECD define principles, with which businesses handling personal information such as companies should comply, concerning eight items, namely, purpose specification, use limitation, collection limitation, data quality, security safeguards, openness, individual participation, and accountability. Member countries of the OECD are proceeding with improvements of systems such as domestic laws and guidelines so as to follow the eight principles toward protection of privacy and protection of personal information. As a result, companies handling personal information are urged to cope with such systems. Therefore, the companies undertake various new tasks and require personnel and financial cost to carry out the tasks.

The advent of computer networks has made it easy to exchange a large quantity of personal data in an electronic form. Thus, once personal information is accidentally leaked, it is likely that a large number of people are suffered by the leakage of information. Moreover, in accordance with the development of the Internet, a risk of litigations in a form of damages with respect to the leakage of information increases. In these days, since people are more and more conscious of privacy, companies are accused of not only responsibility for handling of personal information but also moral responsibility. Therefore, a risk of unexpected leakage of personal information is also recognized in a form of a risk factor that causes deterioration of brand images. In other words, in order to avoid such risks, many companies have to spend more for managing personal information appropriately. As a system supporting jobs concerning management of personal information, a personal information management system, which has an access control function based on a consent, for, in particular, personal information in an electronic form is known (hereinafter referred to as first conventional technique). An explanation about the first conventional technique is found, for example, in http://www-6.ibm.com/jp/software/tivoli/products/privacy.html.

The first conventional technique has a function of disclosing a policy for handling personal information such as a purpose of usage and data collecting items and recording a consent from a provider of personal information such as a consumer and a user to the policy for handling personal information. In addition, the first conventional technique has an access control function of limiting the use of personal information in a company to appropriate users. Access control based on a consent to follow the policy is realized on the basis of authorization of a program executed by a computer. Moreover, the first conventional technique has a function of recording which user accesses such personal information for what kind of purpose of usage.

As publicly-known means for anonymously managing so-called "subtle information" and "sensitive data" out of personal information, there is a system for handling medical information (hereinafter referred to as second conventional technique). The second conventional technique is explained in, for example, JP-A-2001-357130. The second conventional technique 2 separates personal identification information such as names, addresses, and dates of birth and disease information such as genetic information other than the personal identification information, encrypts the respective kinds of information with different keys, and stores decryption keys for the information in a recording medium such as an IC card. This makes it possible for an owner of the IC card to control the use of the individual identification information and the disease information. The system allocates a management code that associates the personal identification information and the disease information. Using this management code allows to use the disease information anonymously without using the personal identification information.

Protective laws and guidelines in the respective member countries complying with the eight principles of the OECD stipulate, as essential requirements, that a purpose of usage should be clearly described in a policy for handling individual information and a consent to the usage of the information should be obtained from an information provider. The first conventional technique realizes control of access to accumulated personal information based on a consent to follow the policy. However, the first conventional technique has a problem in that an information provider cannot grasp the state of use of personal information. The same problem also occurs when jobs using the personal information are entrusted to other companies. The first conventional technique does not provide means with which an entrusting company can manage the state of use of information by an entrusted company.

The second conventional technique has a problem in that use of the personal identification information in which the disease information is not required, is also limited. In the second conventional technique, although it is also possible not to encrypt the disease information, the personal identification information is always encrypted and stored in order to guarantee confidentiality. Therefore, the decryption key stored in the IC card or the like is always required for decryption of the personal identification information. In addition, in the second conventional technique, the management code associating the personal identification information and the disease information is an unencrypted plain text. The management code is never changed once granted. Therefore, once a system user obtains the decrypted personal identification information, after that, the system user can associate the disease information with the acquired personal identification information freely. Thus, it turns out that confidentiality is not taken into account.

The problems of the second conventional technique are caused by a constitutional principle itself that does not depend on a field of application. For example, when the second conventional technique is applied to management of customer information in a retail shop, it is conceivable to handle a purchase history as disease information. However, the second conventional technique cannot be used for an application in which only the personal identification information is referred to for identification inquiry at a customer counter in a call center or the like.

SUMMARY OF THE INVENTION

The invention has means for executing processing for receiving one or more anonymous IDs, which are created according to a hash function, having a personal ID for identifying a specific individual as a key and one or more anonymous data for management including one or more conditions for permitting personal data usage from a client, processing for deciding whether the received anonymous IDs conflict with an anonymous ID stored in a server and sending a result of the decision to the client, processing for, when there is no conflict, storing the anonymous data for management in a database, and processing for replacing anonymous IDs in a database created from the same personal IDs as the received anonymous IDs, with the received anonymous IDs.

The invention also has means that receives an anonymous ID from a client and accumulates electronic data as a key, which can be collated with personal data to identify a specific individual.

When a personal data management server requests the client, who has sent the stored anonymous ID, it can be controlled whether the stored personal ID can be received according to the conditions for permitting personal data usage.

This makes it possible to manage personal data anonymously and constitute a system in which the personal data management server seeks permission of the client when the personal data of the client are used in association with one another. Therefore, it is possible to overcome the problems of the first conventional technique.

In the invention, since relevancy among individual data is cut off by an anonymous ID, it is not essential to encrypt personal information to be stored in order to protect personal information. Therefore, it is possible to overcome the problems of the second conventional technique.

In the invention, a purchase history is collected using an anonymous ID and a response from a member card or an agent server is required for operation for associating the anonymous ID with a personal ID. Thus, it is possible to record a result of usage of personal data like computer-assisted name identification outside a system. Consequently, a user can confirm whether personal data is used correctly in accordance with a consent given to a personal information handling agent.

Further, in the invention, personal data itself is stored in a plain text without being encrypted. However, an anonymous ID is regenerated every time the anonymous ID is associated with a personal ID on a server side and an anonymous ID serving as a collection key for accumulated purchase histories is also regenerated. Therefore, an advantage can be expected in that personal data is prevented from being used without permission while giving elasticity for allowing data having the personal ID and the anonymous ID as keys to be used in a range permitted by access control as long as computer-assisted name identification is not performed.

BRIEF DESCRIPTION OF THE DRAWINGS

In the accompanying drawings:

FIG. 3 is a diagram of input data and internal data in the first embodiment;
FIG. 4 is a diagram of output data in the first embodiment;
FIG. 9 is a diagram of internal data that is used in the second embodiment.

DESCRIPTION OF THE PREFERRED EMBODIMENTS

Definitions of terms in the following description are as follows. Personal information is information on an individual, with which a specific individual can be identified according to a name, a date of birth, other descriptions, and the like included in the information. The personal information includes information like an address that can be collated with other information easily and with which a specific individual can be identified. Personal data means mainly personal information of an electronic form that constitutes a database in which a computer can perform retrieval easily.

Figure 1:
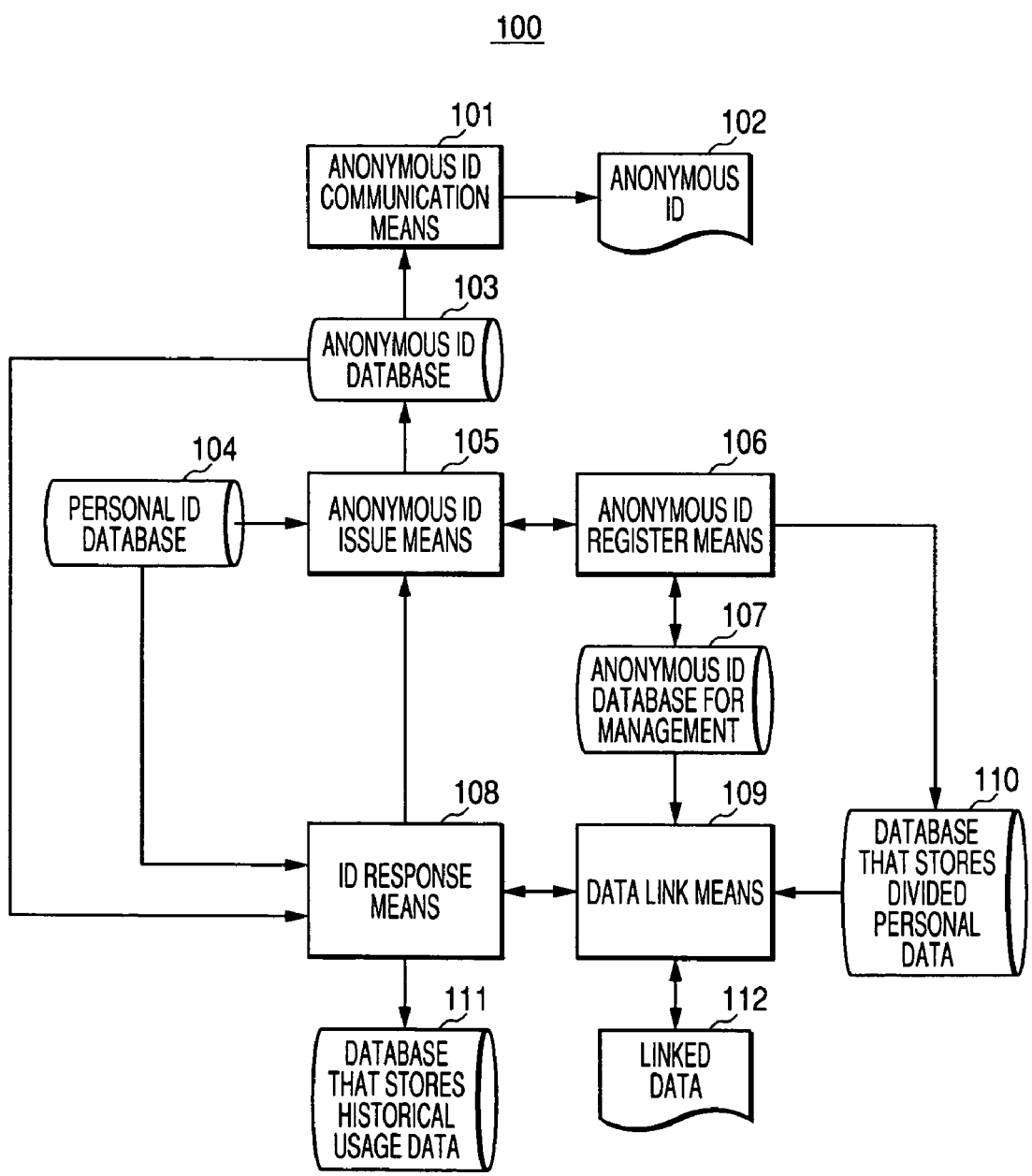
FIG. 1 is a diagram of a basic structure of the invention.

A system 100 in FIG. 1 shows a basic structure of the invention. Reference numeral 101 denotes anonymous ID transmission means; 102, an anonymous ID; 103, an anonymous ID database; 104, personal ID database; 105, anonymous ID issue means; 106, anonymous ID register means; 107, anonymous ID database for management; 108, ID response means; 109, data link means; 110, a database that stores divided personal data; 111, a database that stores usage history data; and 112, linked data.

Identifiers (ID) for specifying individuals are stored in the personal ID database 104. The anonymous ID issue means 105 issues an ID for handling an individual anonymously on the basis of data stored in the personal ID database 104. This anonymous ID has a characteristic that it is difficult to estimate a personal ID from a value of the anonymous ID. The anonymous ID is stored in the anonymous ID database for management 107 and the anonymous ID database 103 by the anonymous ID register means 106. In this case, the anonymous ID register means 106 rewrites data stored in the database that stores divided personal data using the stored anonymous ID. The anonymous ID transmission means 101 sends the anonymous ID 102 stored in the anonymous ID database 103 to the outside of the system 100 in response to a request from the outside of the system 100.

The database that stores divided personal data 110 is a database that manages personal data according to personal IDs and anonymous IDs. The database that stores divided personal data 110 stores personal data having the sent anonymous ID 102 as a key, for example, data such as a purchase history and also stores personal data such as names and addresses having the personal IDs stored in the personal ID database 104 as keys. The data link means 109 links data having an anonymous ID as a key and data having a personal ID as a key and outputs the data to the outside of the system 100 as the linked data 113. Data linking operation is, for example, a join arithmetic operation in RDB and is performed frequently as processing called computer-assisted name identification in an application program that handles personal data. However, the data link means 109 never links data unless an appropriate response is received from the ID response means 108. The ID response means 108 records a request from the data link means 109 and a response to the request in the database that stores usage history data 111.

The invention adopts a constitution in which an appropriate response from the ID response means 108 is required in associating a set of personal data stored in the database that stores divided personal data 110 with one another. In other words, it is possible to manage and record usage of personal data through operation of the ID response means 108.

Figure 10:
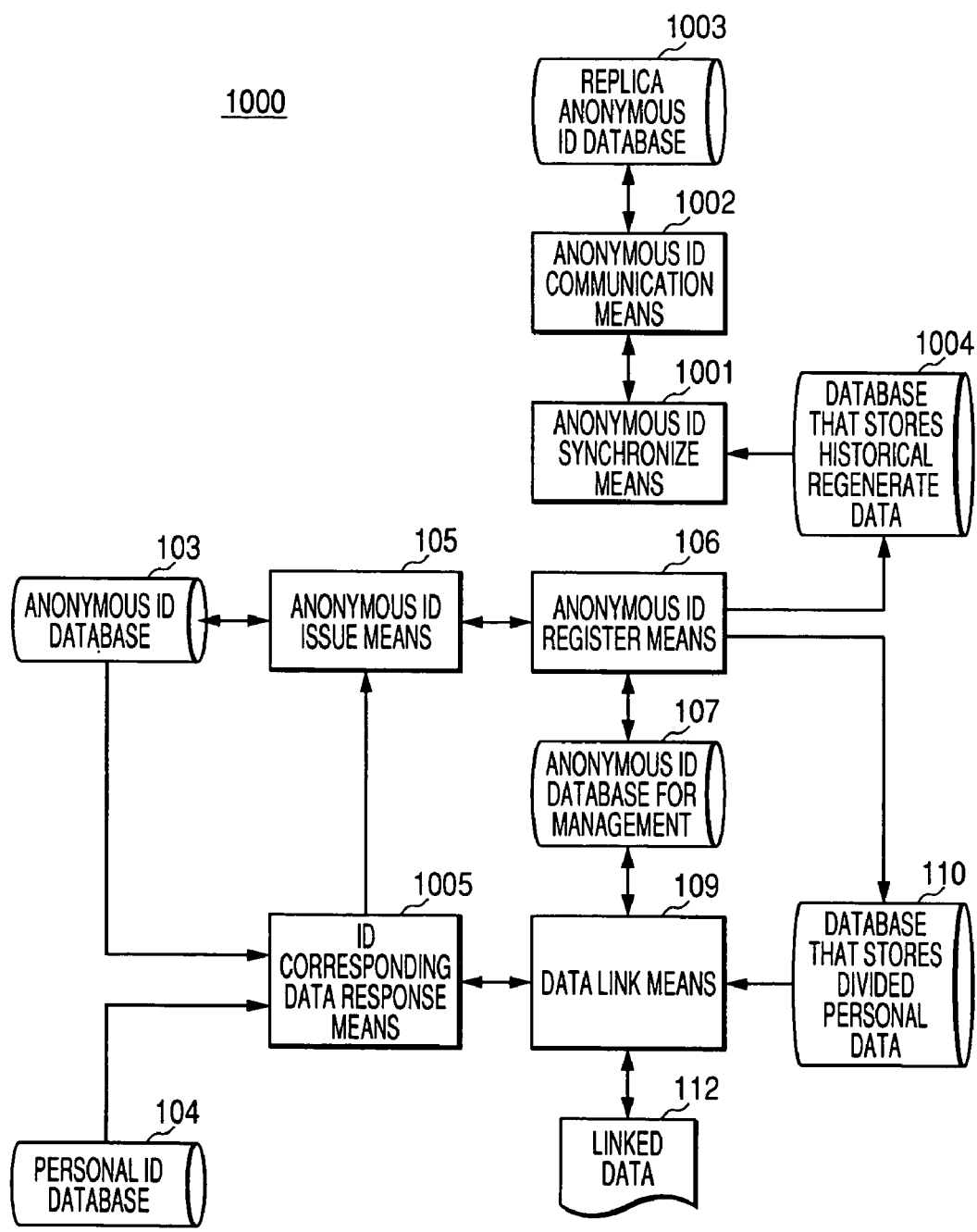
FIG. 10 is an alternative plan of a basic structure of the invention.

In addition, a system 1000 in FIG. 10 is adapted to be applied when a personal data manager, who permits data link operation or computer-assisted name identification, and a user, who uses only an anonymous ID, are different. In the system 1000, an ID corresponding data response means 1005 is used instead of the anonymous ID response means 108 in the system 100 and a database that stores anonymous ID regeneration history data 1004 is used instead of the anonymous ID database for management 107 in the system 100. Regeneration histories of anonymous IDs are stored in the database that stores anonymous ID regeneration history data 1004. Anonymous ID communication means 1002 acquires a latest anonymous ID from anonymous ID synchronize means 1001 and stores the anonymous ID in a replica anonymous ID database 1003. However, the anonymous ID communication means 1002 is not always in an online state. The anonymous ID issue means 105 may regenerate an anonymous ID while the anonymous ID communication means 1002 is in an offline state. The system 1000 is adapted to require an appropriate response from the ID corresponding data response means 1005 in associating a set of personal data stored in the database that stores divided personal data 110 with one another. In other words, it is possible to manage and record usage of personal data through operation of the ID response means 1005. Further, it is possible to give flexibility of operation to the system 1000 by using the anonymous ID synchronize means 1001. For example, it is possible to give the personal ID database 104 and the anonymous ID database 103 to a personal data manager and give replica anonymous ID databases to other system users.

First Embodiment

Details of the invention will be hereinafter explained using embodiments of the invention. Structures of systems, internal data, input data, and output data will be described first and, then, processing procedures will be described for the respective embodiments.

Figure 2:
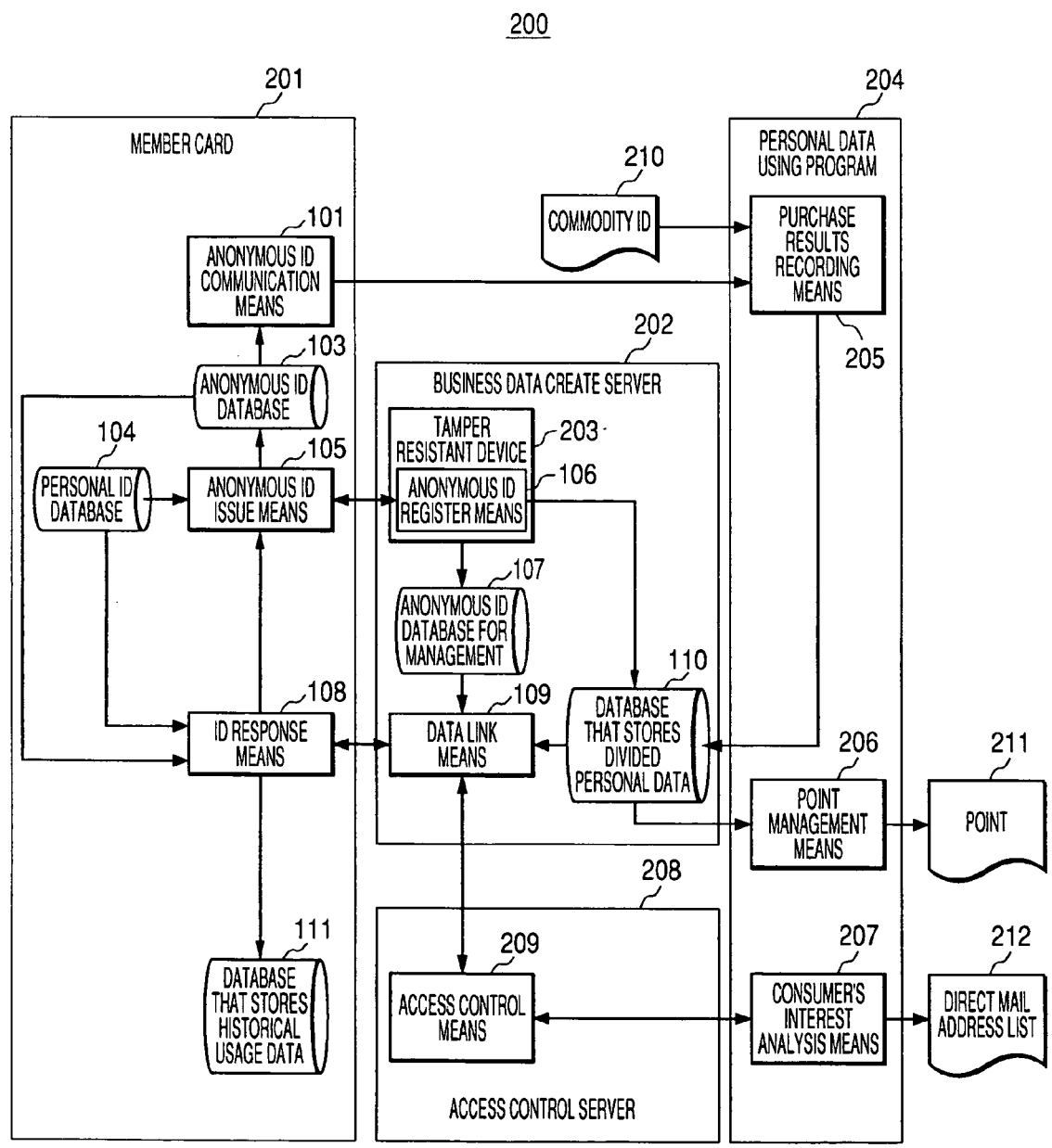
FIG. 2 is a diagram of a first embodiment of the invention.

FIG. 2 is a diagram of a first embodiment showing an example of application of the invention in a retail shop. A system 200 is a member management system that uses a member card for a retail shop. The system 200 includes a member card 201, a business data create server 202, a personal data using program 204, and an access control server 208. The system 200 collects a purchase history using the member card and outputs a point 211 and a direct mail (DM) address list 212. The member card serving as a client device is an IC chip having a memory and a processor mounted thereon. Under a principle of the invention, it is possible to replace the member card with a personal digital assistant (PDA), a cellular phone, or the like.

The member card 201 includes the anonymous ID transmission means 101, the anonymous ID database 103, the personal ID database 104, the anonymous ID issue means 105, the ID response means 108, and the database that stores usage history data 111.

Referring to FIG. 3, data 300 is stored data in the personal ID database 104 and includes a field 305 representing a personal ID and fields representing conditions of consent for use. Stored data 321 in the field 305 takes an integer value that does not overlap that of other members. When the member card is issued, record data 319 is stored in the personal ID database 104. There are zero or more fields representing conditions of consent for usage of data 301. In this embodiment, three fields 307, 308, and 309 correspond to the fields. The respective fields hold the OK/NG for use of personal data, for a DM address, for analysis identifying an individual, and for statistic analysis not specifying an individual. In the fields 307, 308, and 309, on the basis of a consent given by a member, OK is stored as a value when use of personal data is permitted and NG is stored as a value when use of personal data is not permitted.

Data 301 is stored data in the anonymous ID database 103 and includes a field 306 representing an anonymous ID and the fields 307, 308, and 309 representing conditions of a consent for usage. For convenience of explanation, "A1001" is set in stored data 320 in the field 306 to make it easily understood that the data 320 is a value created from the data 321. However, actual data 320 is created as a hash value having the data 321 as a key. One of typical hash functions for creating the data 320 is MD5. When such a hash function is used, the data 320 takes a value like a pseudo-random number. Thus, it is extremely difficult to estimate the data 321 from the data 320.

The business data create server 202 includes the anonymous ID register means 106, the anonymous ID database for management 107, the data link means 109, and the database that stores divided personal data 110. However, the anonymous ID register means 106 is established in a tamper resistant device 203. Thus, it is impossible to rewrite the contents of the anonymous ID register means 106 without permission or observe the internal processing of the anonymous ID register means 106 freely from the outside. Usually, the anonymous ID register means 106 is established in the tamper resistant device 203 when manufactured.

The personal data using program 204 includes purchase results recording means 205, point management means 206, and consumer's interest analysis means 207. A commodity ID 210 is an ID such as a JAN code given to a commodity. A shop clerk inputs the commodity ID 210 from a register using a bar code, an RFID tag, or the like. The system 200 gives an anonymous ID to the inputted commodity ID 210 and records the anonymous ID. A member card connected to the register sends the anonymous ID. The consumer's interest analysis means 207 analyzes personal data including a purchase history and outputs a list of members from whom an interest to purchase a commodity can be expected by delivery of a DM.

The access control server 208 has access control means 209 to control the access to associated (identified) personal data by the personal data using program 204.

Data 302 is stored data in the anonymous ID database for management 107. One record data in the data 302 corresponds to one member. Respective fields are the same as those in the table 301. Anonymous IDs A1001, A2001, and A3001 are allocated to members with personal IDs 1001, 2001, and 3001, respectively.

Data 303 and data 304 are stored data in the database that stores divided personal data 110. Each record of the data 303 is personal data having the personal ID 305 as a key and recorded when a member card is issued anew. Each record includes fields 305, 310, 311, and 312 representing a personal ID, a name, an address, and an age, respectively.

Each record of the data 304 is personal data having the anonymous ID 306 as a key and registered by the purchase results recording means 205. Each record includes a field 306 representing an anonymous ID and fields 313, 314, and 315 representing a date of purchase, a commodity of purchase, and a price, respectively as a purchase history. A date, when the purchase results recording means 205 created a record, is stored in the field 314. A classification of a commodity of purchase, which is determined on the basis of a JAN code given by a bar code or a separate purchase item code given by the RFID tag, is stored in the field 314. Under the principle of the invention, the field 314 may be a JAN code or a separate commodity of purchase code. A price of the commodity of purchase is stored in the field 315. The records constituting the data 304 include a record for point management, such as data 322. The data 322 represents that an anonymous member A1001 used a point equivalent to 1500 yen for discount on Apr. 15, 2004.

Data 316 is stored data in the database that stores usage history data 111. Each record of the data 316 includes fields 306, 317, and 318 representing an anonymous ID, a date of usage, and a purpose of usage, respectively. The ID response means 108 creates and registers the records of the data 316. The field 317 is a date when the ID response means 108 replied to a request for use of personal data from the data link means 109. In the field 318, the ID response means 108 records a purpose of usage notified from the data link means 109.

Data 401 is output data of the point management means 206 and printed on a receipt in a typical example of use. Each record includes fields 306, 404, 405, and 406 representing an anonymous ID, an accumulating total point, a used point, and an additional point, respectively. The field 404 represents points owned by a client after purchase of a commodity. The field 405 represents points used for discount for the purchase of a commodity. The field 406 represents points added anew by the purchase of a commodity.

Data 402 is output data of the consumer's interest analysis means 207 and is print data on an address sticker of a DM in a typical example of use. Each record includes a field representing personal data necessary for DM send out processing and a field representing a result of analysis. Fields 306, 313, and 314 represent a personal ID, a name, and an address, respectively. A field 407 represents a predicted value of a ratio of response to a meet commodity guide. Two or more fields representing a result of analysis such as the field 407 may be provided. As an example of use of the data 402, when a DM for a meet commodity guide is delivered to a certain number of members, members from whom a purchase behavior of a commodity can be expected are selected preferentially.

The structure of the system, the internal data, the input data, and the output data in the first embodiment are as described above. Next, a processing procedure will be explained according to sequence charts in the accompanying drawings. In the respective sequence charts, a triangle with a black end point represents a procedure call. For example, processing 701 corresponds to the procedure call. In the procedure call, a calling side (a start point side) does not execute the next processing until the processing is completed. An arrow line with a bar-like end point represents asynchronous communication. For example, processing 714 corresponds to the asynchronous communication. In the asynchronous communication, respective kinds of processings are executed in parallel and a transmission side (a start point side) executes the next processing without waiting for completion of communication processing.

Processing created across the member card 201 and the business data create server 202 is started after mutual authentication of the member card 201 and the business data create server 202 is completed. During the processing, a communication path between the member card 201 and the business data create server 202 is protected by an appropriate physical and encryptive security mechanism. A publicly-known technique is used for means for the mutual authentication and the communication path protection.

Figure 5:
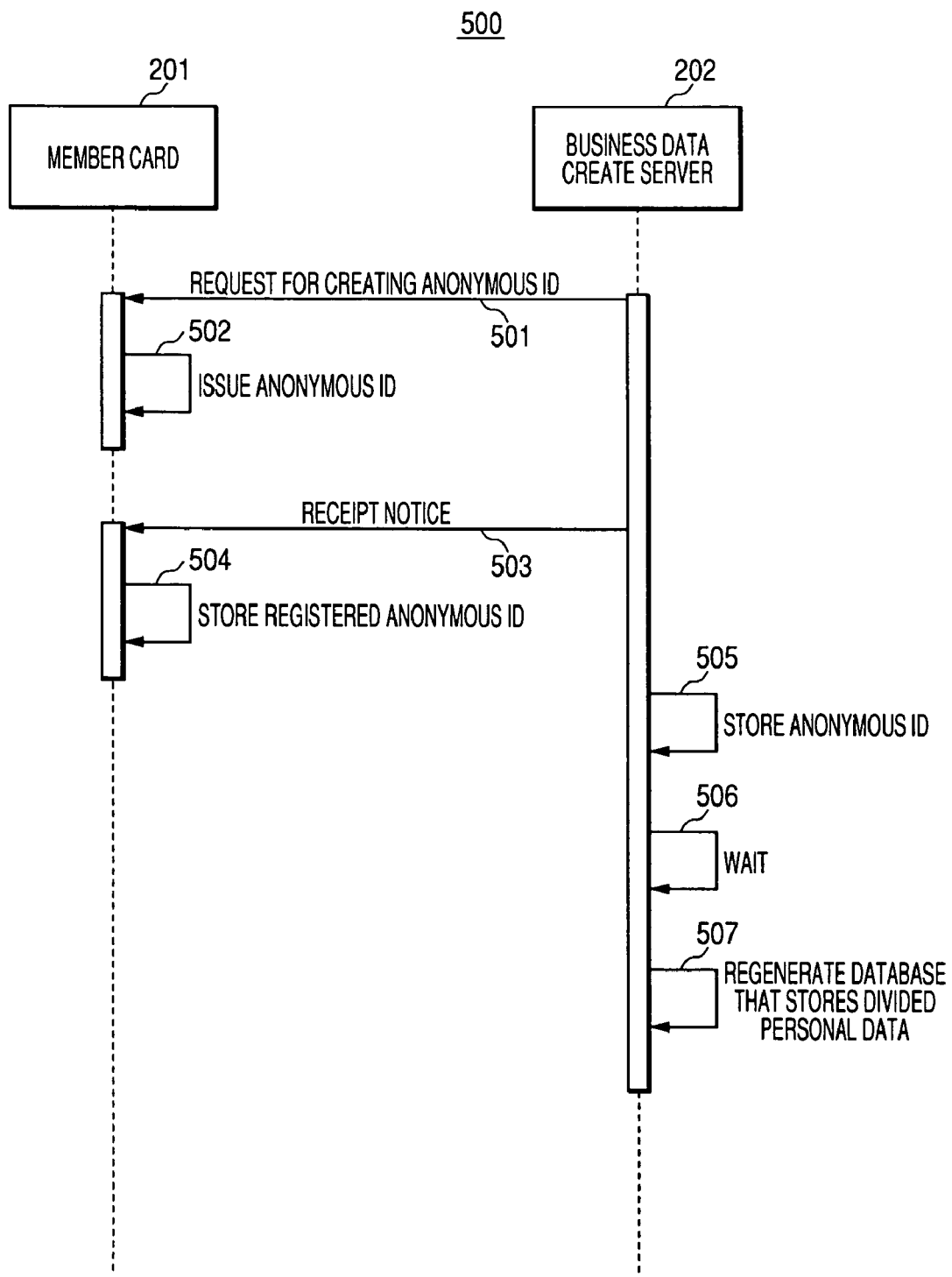
FIG. 5 is a diagram of processing in which a member card registers an anonymous ID in a system.
Figure 6:
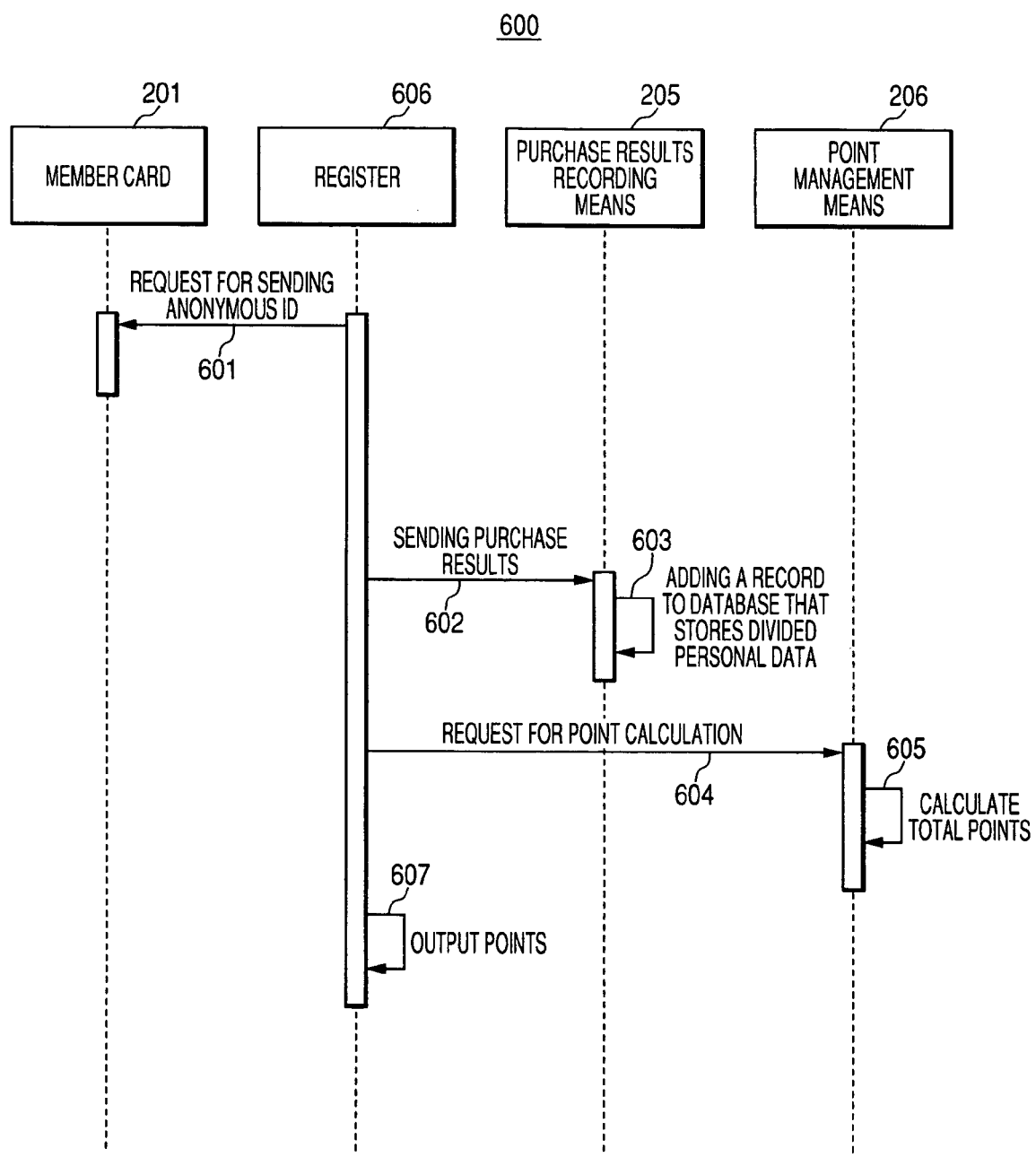
FIG. 6 is a diagram of processing for point calculation using an anonymous ID.
Figure 7:
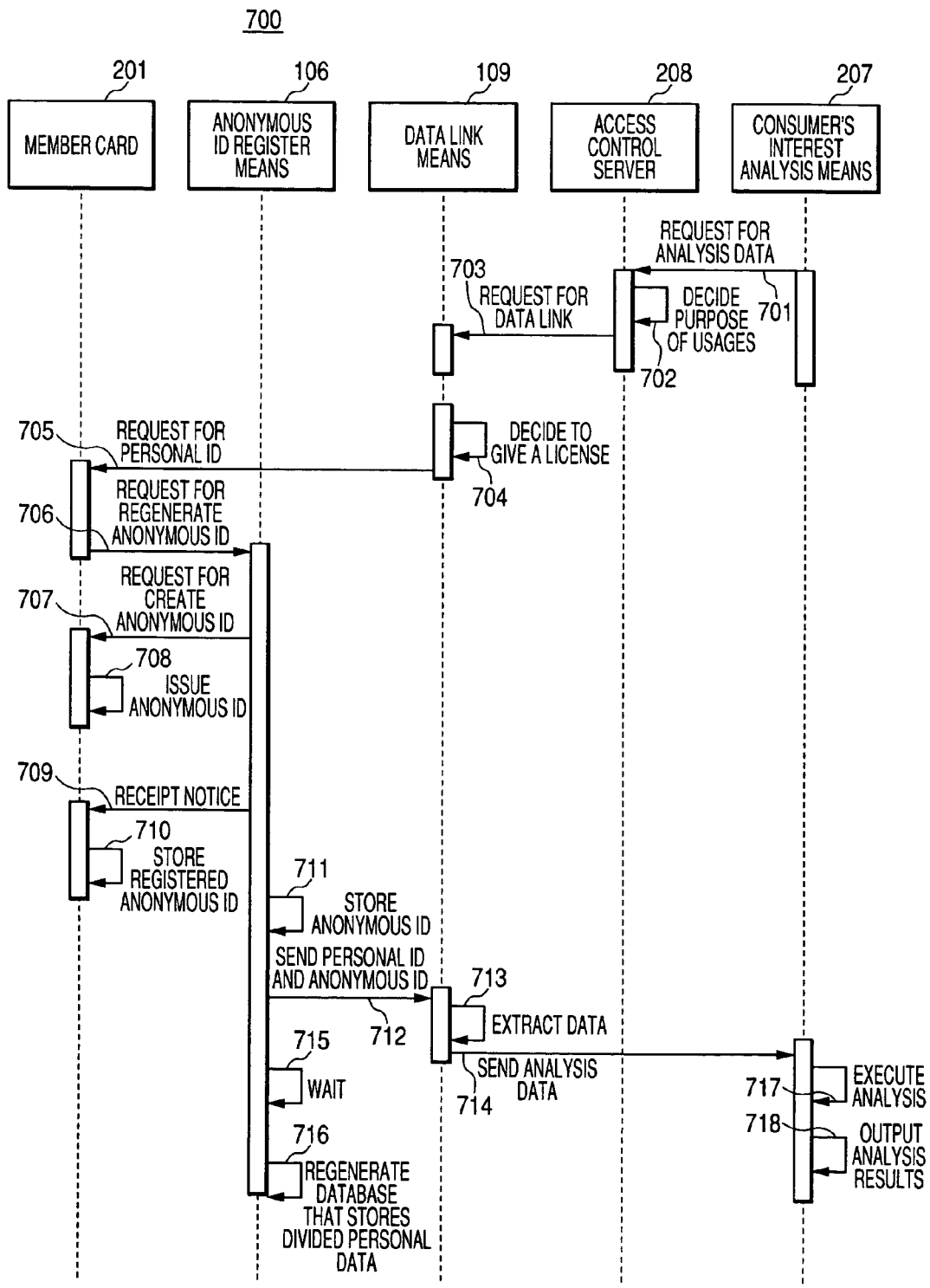
FIG. 7 is a diagram of processing for creating linked data that is used by consumer's interest analysis means.

A sequence 500 in FIG. 5 shows a flow of processing for registering an anonymous ID in the system 200. The processing for registering an anonymous ID is executed when a member card is issued anew and when the ID response means 108 replies with a personal ID associated with the anonymous ID. When the member card is connected to a card reader and establishment of mutual authentication and communication path is completed, in processing 501, the anonymous ID register means 106 creates a random positive integer value r and requests the anonymous ID issue means 105 to issue an anonymous ID together with r.

Next, in processing 502, the anonymous ID issue means 105 creates m record data including the fields 306, 307, 308, and 309. A value of the record data 319 is stored in the fields 307 and 308 and all records have the same value. A value of an anonymous ID in the field 306 is M hash values different from one another that are obtained according to a hash function $h(i+r+m)$ such as MD5. Here, i indicates a personal ID of the data 321 and m indicates one or more and M or less continuous integers (m=1, 2, . . . , M−1). M indicates an arbitrary parameter taking an integer of one or more that is given when a card is issued. M is determined in advance according to conditions of use approved by a member when a member card is issued and a form of use of purchase result data. Although M is 1 for point management in this embodiment, M may be equal to or larger than 2 when, for example, purchase result data is used only for the purpose of billing.

In this way, a key of the hash function has the random value r and the anonymous ID issue means 105 is stored in the tamper resistant device. Consequently, even when a retail shop using the system 2000 determines a personal ID, it is possible to prevent an anonymous ID from being estimated from the personal ID.

When the processing 502 ends, the anonymous ID issue means 105 sends the record data created anew in the processing 502 and the data 320, which is the anonymous ID issued in the past, to the anonymous ID register means 106 as a return value of the procedure call in the processing 501. When there is no anonymous ID issued in the past and the data 320 is empty, the anonymous ID issue means 105 sends a code indicating a defect instead of the data 320.

Subsequently, the anonymous ID register means 106 decides whether the anonymous ID requested to be registered conflicts with the anonymous ID registered in the anonymous ID database for management 107. When conflict is detected, the sequence is repeated from the processing 501. When the number of times of the repetition reaches the number of times determined in advance, the system throws exceptions and ends the sequence 500. However, in a hash function such as MD5 including an irreversible one-way function sensitive to an initial value in a calculation method, likelihood of conflict of hash values is extremely low. Thus, it can be expected that, in implementation, the sequence functions sufficiently with the procedure in this embodiment. When no conflict is detected, the system proceeds to processing 503 and the anonymous ID register means 106 notifies the anonymous ID issue means 105 that the created ID is received.

In processing 504, the anonymous ID issue means 105 adds the created record data to the anonymous ID database 103. The record data stored in the anonymous ID database 103 may be deleted as required.

Next, the system proceeds to processing 505 and the anonymous ID register means 106 adds the record data received as a return value of the processing 501 to the anonymous ID database for management 107.

In step 506, the anonymous ID register means 106 temporarily comes into a waiting state. When the next member card is connected, the processing 501 is executed with respect to the member card. When T seconds or more elapses after the anonymous ID register means 106 turned into the waiting state or when the number of new anonymous IDs, which are received from the member card but unregistered, is less than K•M, processing 507 is executed. Here, K is an arbitrary parameter taking an integer value equal to or larger than 1. When it is desired to process anonymous IDs of plural member cards at a time in the processing 507, the desired number of member cards is designated as K. T indicates a parameter of timeout and a real number value larger than 0 is designated as T by a unit of second.

In the processing 507, the anonymous ID register means 106 retrieves the anonymous ID issued in the past, which is received in the processing 503, from the database that stores divided personal data and replaces the anonymous ID with the anonymous ID created anew. When M is equal to or larger than 2, a new anonymous ID is selected at random for each record to be replaced.

The processing of the sequence 500 is as described above.

A sequence 600 shows a flow of processing for purchase results recording and processing for point regeneration following the processing for purchase results recording. The purchase results recording means 205 and the point management means 206 are programs called from a register. In a typical example, the sequence 600 is started after a total amount is calculated by accounting in the register. In the following explanation, it is assumed that a member card is connected to the system 200 through a register 606 provided outside the system 200 and an ID of a commodity under settlement is temporarily held in the register 606.

In processing 601, first, the purchase results recording means 205 requests the member card 201 to send an anonymous ID. Subsequently, the anonymous ID transmission means 101 in the member card 201 extracts one anonymous ID at random from the m anonymous IDs with reference to the anonymous ID database 103 and sends the anonymous ID to the register 606.

In processing 602, the register 606 sends the ID of the commodity temporarily held by the register 606 and the anonymous ID received in the processing 601 to the purchase results recording means 205.

In the processing 603, the purchase results recording means 205 forms new record data in the format of the data 304 and stores the record data in the database that stores divided personal data 110.

When the recording of purchase results is completed, the register 606 sends the anonymous ID received in the processing 601 to the point management means 206 according to processing 604 and starts point calculation processing.

In processing 605, the point management means 206 retrieves the data 304 stored in the database that stores divided personal data 110 with the received anonymous ID as a key and calculates an accumulating total point. There are various methods of calculating a point. For example, the point management means 206 calculates an available accumulating total point on the basis of a total of points used in the past and a total amount of commodities in the recent one year. When the processing 605 ends, the register 606 obtains an accumulating total point as a result of the procedure call in the processing 604.

In processing 607, the register 606 creates data 401 on the basis of accumulating total points, commodity data under accounting and data of presence or absence of point usage and outputs the data 401 to a receipt or a screen of the register.

The processing of the sequence 600 is as described above.

A sequence 700 shows a flow of processing in the case that the data 303 managed by a personal ID and the data 304 managed by an anonymous ID are linked and used. The sequence 700 is started when a DM address list is created using the consumer's interest analysis means 207. In the sequence 700, when the consumer's interest analysis means 207 requests personal data for analysis, a member from whom a consent for usage is decided using an anonymous ID, and the data link means 1090 comes into a member card connection waiting state. When a member card having the anonymous ID is connected in this state, processing for specifying a personal ID is started, and the consumer's interest analysis means 207 obtains analysis data. Details of the sequence 700 are as described below.

First, the consumer's interest analysis means 207 requests analysis data in the processing 701. Specifically, the consumer's interest analysis means 207 gives a data name (a table name, a field name) required for creating a DM send out list to the access control means 209 in the business data create server as an argument to call the processing 701. In the creation of a DM send out list, data names and field names of the data 303 and 304 are requested.

Subsequently, the system proceeds to processing 702 and the access control means 209 decides a purpose of usage of personal data from a type of a program which has requested analysis data. Since the requesting program is the consumer's interest analysis means 207, it is decided that the purpose of usage is DM send out. In addition, using the determined purpose of usage, the access control means 209 decides whether the requested data name may be used. When the access control means 209 decides to reject usage, the access control means 209 returns a false value to the consumer's interest analysis means 207 as a return value of the processing 701. When the access control means 209 decides to permit usage, the access control means 209 sends a data link request according to processing 703 and returns a true value to the consumer's interest analysis means 207 as a return value.

In processing 703, the data link means 109 comes into a state of waiting for communication with a member card. Processing 704, processing 705, and processing 706 are executed once, respectively, for all the member cards connected within X seconds after the data link means 109 came into the waiting state. In the following explanation, for convenience of explanation, a flow of processing for one member card will be explained.

When a member card is connected to the system 200 and a communication path is established, processing 704 is started. First, the data link means 109 receives an anonymous ID from the ID response means 108 and decides whether or not to give a permission of usage with reference to the data 302 stored in the anonymous ID database for management 107. When DM send out is OK, the system proceeds to processing 705. When DM send out is NG, the data link means 109 comes into the waiting state again without taking any action.

In the processing 705, the data link means 109 sends a purpose of usage to the ID response means 108 and request a personal ID.

In processing 706, the ID response means 108 decides whether the received purpose of usage is allowed or not, using the consent for usage stored in the anonymous ID database 106. Next, the ID response means 108 informs the anonymous ID issue means 105 that a personal ID is requested. Next, the ID response means adds a new record to the data 316 stored in the database that stores usage history data 111. Subsequently, the anonymous ID issue means 105 requests the anonymous ID register means 106 to regenerate an anonymous ID.

From the processing 707 to the processing 711, the processing same as the processing 501 to the processing 505 in the sequence 500 is executed and a new anonymous ID is registered in the database that stores divided personal data 110.

In processing 712, the data link means 109 sends the personal ID requested in the processing 705 and the M anonymous IDs used at the point of the processing 705. Next, the data link means 109 comes into a standby state for changing the database that stores divided personal data 110.

In processing 713, the data link means 109 creates analysis data using the personal ID and the anonymous ID received in the processing 712. The data link means 109 extracts a record having the personal ID that is stored in the data 303 of the database that stores divided personal data 110. In addition, the data link means 109 extracts a record having the anonymous ID that is stored in the data 304 and replaces the anonymous IDs of the respective record with personal IDs corresponding thereto.

In processing 714, the data link means 109 sends the analysis data created in the processing 713 to the consumer's interest analysis means 207 asynchronously.

In processing 715 and processing 716, processing same as the processing 506 and the processing 507 of the sequence 500 is performed to regenerate the anonymous ID stored in the database that stores divided personal data 110.

On the other hand, the consumer's interest analysis means 207 receives the analysis data sent in the processing 714 and starts analysis processing at a point when an amount of data designated in advance is received. In processing 718, the consumer's interest analysis means 207 outputs the data 402 as a result of the analysis.

In this way, it is a characteristic of the invention that a record of use of personal data is left in the database that stores usage history data 111. In this embodiment, it is possible to refer to the data by causing a terminal in a shop or a card reader connected to a PC to read a member card.

Note that, typically, the personal data using program 204 is stored in a computer linked to the business data create server 202 through a network.

Here, in FIG. 2, the first embodiment is explained using functional blocks. Processing using these functional blocks is realized by hardware, software, or a combination thereof.

In other words, computer, a server, a card, and the like in the figure have at least an arbitrary CPU and a memory or other LSIs as hardware. For example, the programs such as the purchase results recording means 205, the point management means 206, and the consumer's interest analysis means 207, which are leaded in the memory, are executed by the CPU, whereby the processing is realized. In addition, the personal data using program 204 may be stored in a computer identical with the business data create server 202.

Second Embodiment

Next, a second embodiment of the invention shown in FIG. 8 will be explained. In a system 800 in FIG. 8, anonymous ID issue processing and usage history data recording processing are performed by a system external to the member card. The member card 201 includes only the personal ID database 104. An ID management agent server 801 includes the anonymous ID transmission means 101, the anonymous ID database 103, the anonymous ID issue means 105, and the ID response means 108. A valid ID decision means 802 is incorporated in the ID response means 108. A usage history data management server includes the database that stores usage history data 111 and usage history data output means 803. A display for usage history data 804 is connected to the usage history data management server. The business data create server 202 and the personal data using program are the same as those in the system 200.

Data 900 is data stored in the anonymous ID database 105. The data 900 is the same as the data 301 except a field 904 representing a term of validity. A value designated by a member or a default value at the time of issuance of a member card is given as a field value of the term of validity when the anonymous ID issue means 105 create the data 900. Data 901 is data stored in the anonymous ID database for management 107 and includes the same fields as those in the data 900. The other data are the same as those in the system 200.

In the system 800, since the anonymous ID issue processing and the usage history data recording processing are performed by the agent server, even when a member card is not connected to the system, it is possible to calculate a point and create a DM address list. However, the valid ID decision means 802 has a function of deciding a term of validity of an anonymous ID and the number of times of valid use. Thus, it is possible to prevent personal data of a member, who stops coming to a shop, from being continuously used without permission.

The systems 200 and 800 in the embodiments described above are on the premise that the invention is applied to a member card using system in a retail shop. The member card is obtained by mounting a memory and a processor on an IC chip. Under a principle of the invention, it is possible to replace the member card with a PDA, a cellular phone, or the like. Therefore, the invention is not limited to the member card using system for a retail shop. The business data create server 202 and the personal data using program 204 may be connected through a network. Therefore, it is possible to apply the invention to entrustment of a personal data using business via a network. For example, when the business data create server 202 in the system 200 or 800 is arranged in an entrusting company and the personal data using program 204 in the system 200 or 800 is arranged in an entrusted company, it becomes possible for the entrusting company to monitor and control personal data usage by the entrusted company.

Figure 8:
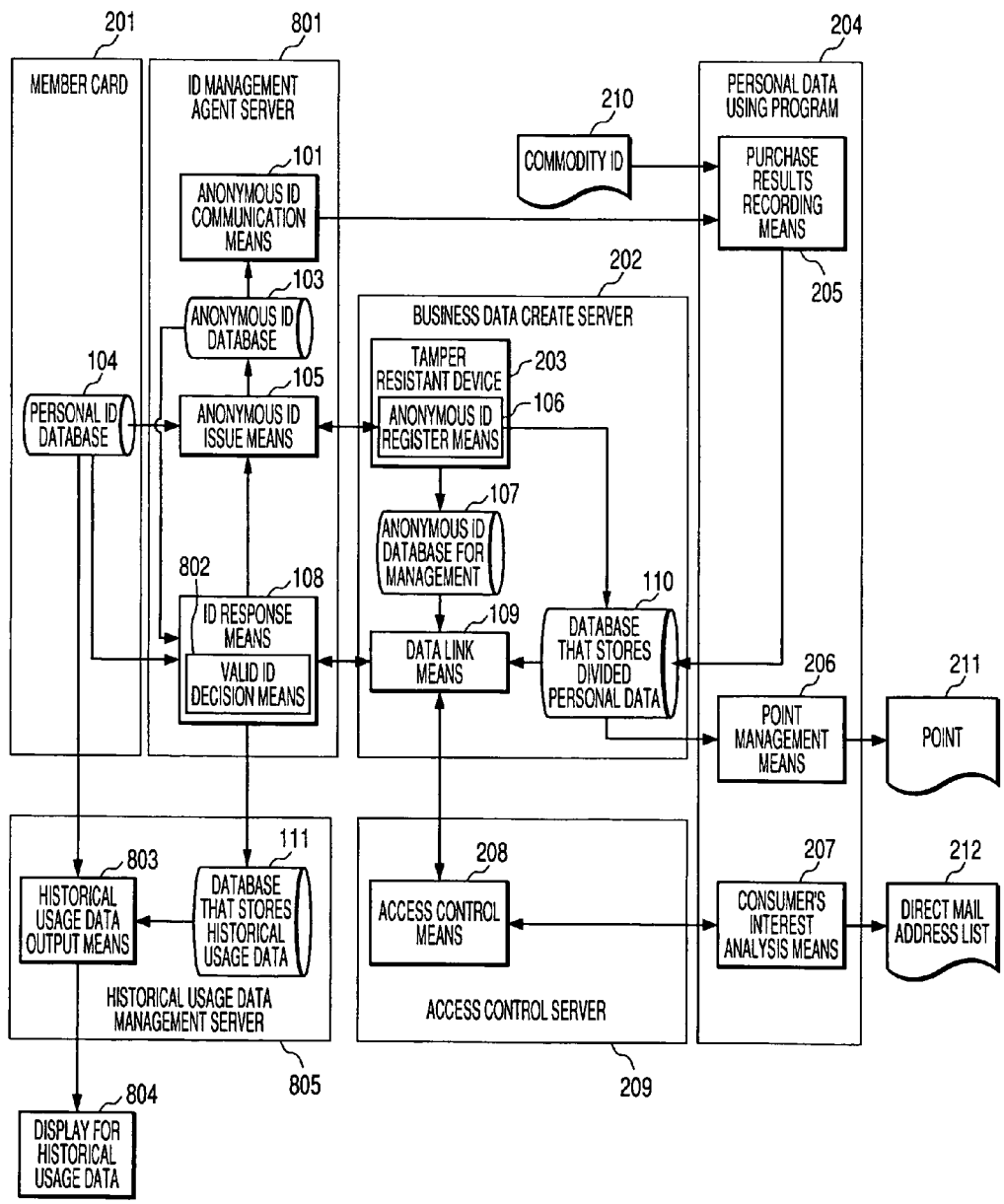
FIG. 8 is a diagram of a second embodiment of the invention.

Note that, typically, the personal data using program 204 in FIG. 8 is stored in a computer linked to the business data server 202 through a network.

Here, in FIG. 8, the second embodiment is explained using functional blocks. Processing using these functional blocks is realized by hardware, software, or a combination thereof.

In other words, a computer, a server, a card, and the like in the figure have at least an arbitrary CPU and a memory or other LSIs as hardware. For example, the programs such as the purchase results recording means 205, the point management means 206, and the consumer's interest analysis means 207, which are loaded in the memory, are executed by the CPU, whereby the processing is realized. In addition, the personal data using program 204 may be stored in a computer identical with the business data create server 202.

Third Embodiment

Next, a third embodiment of the invention shown in FIG. 11 will be explained. A system 1100 includes a member card 1101, a manager card 1102, a business data create server 1106, the access control server 208, and the personal data using program 204. This is an example in which a consumer owns the member card 1101 and a personal data manager owns the manager card 1102 in a retail shop. When the consumer purchases a commodity, the consumer uses the member card 1101 to accumulate or use points. When the consumer accumulates or uses points, the purchase results recording means and the point management means in the personal data using program 204 process only the data that is managed by an anonymous ID.

Figure 11:
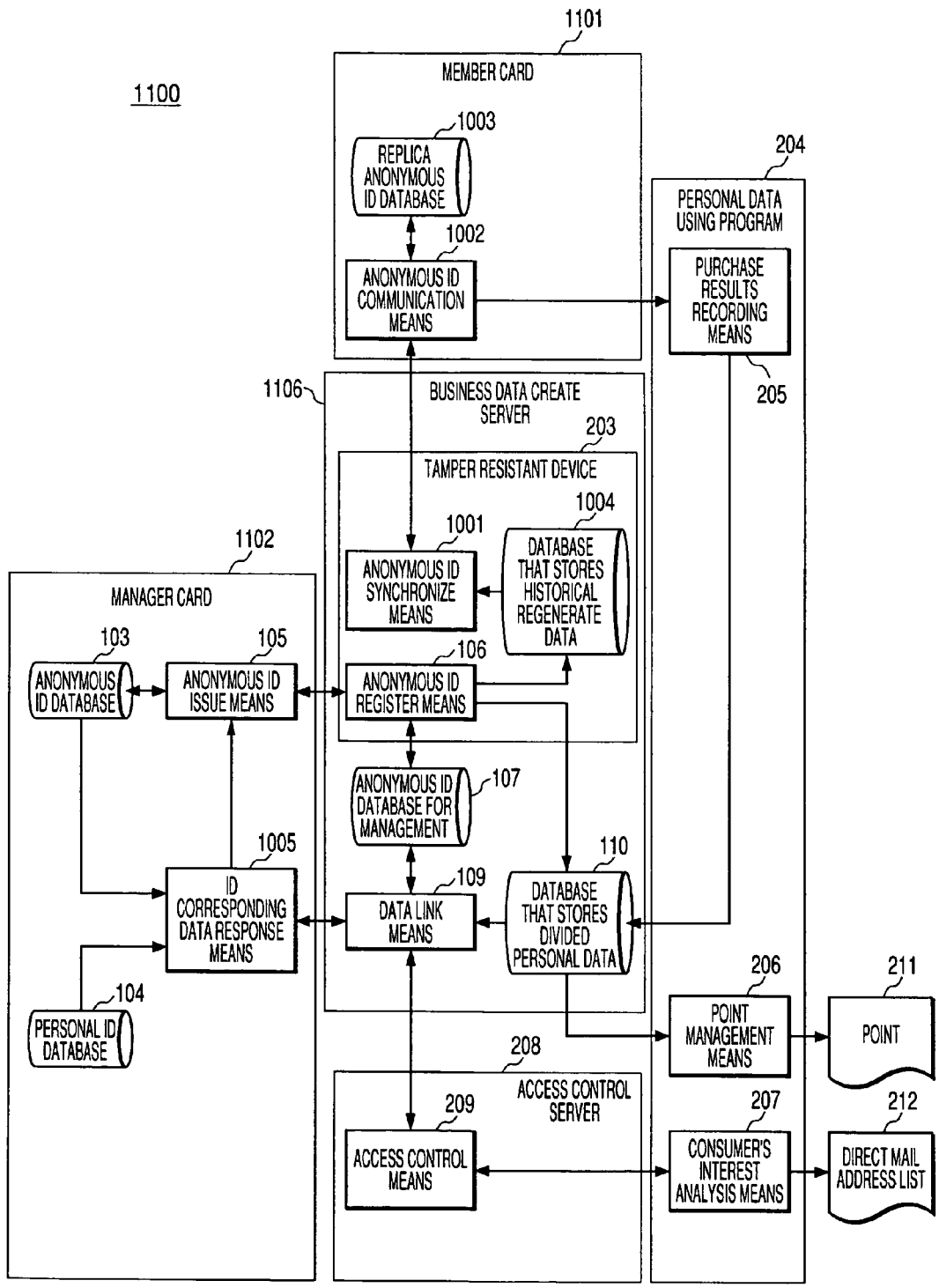
FIG. 11 is a diagram of a third embodiment of the invention.

Note that, typically, the personal data using program 204 in FIG. 11 is stored in a computer linked to the business data server 1106 through a network.

Here, in FIG. 11, the third embodiment is explained using functional blocks. Processing using these functional blocks is realized by hardware, software, or a combination thereof.

In other words, a computer, a server, a card, and the like in the figure have at least an arbitrary CPU and a memory or other LSIs as hardware. For example, the programs such as the purchase results recording means 205, the point management means 206, and the consumer's interest analysis means 207, which are loaded in the memory, are executed by the CPU, whereby the processing is realized. In addition, the personal data using program 204 may be stored in a computer identical with the business data create server 202.

The consumer's interest analysis means 207 uses data managed by an anonymous ID and data such as a name and an address managed by a personal ID. The consumer's interest analysis means 207 can use the data in association with one another only when an appropriate response is received from the manager card 1102.

The member card 1101 includes a replica anonymous ID database 1003 and anonymous ID communication means 1002. The manager card 1102 includes ID data response means 1005. The personal ID database 104 and the anonymous ID database 103 are the same as those in the system 200. A business data create server 1106 includes an anonymous ID synchronize means 1001, a database that stores anonymous ID regeneration history data 1004, the anonymous ID register means 106, the anonymous ID database for management 107, the data link means 109, and the database that stores divided personal data 110 that are stored in a tamper resistant device.

The database that stores anonymous ID regeneration history data 1004 only has to be accessed by a holder of a manager card. The database that stores anonymous ID regeneration history data 1004 may be encrypted with an encryption key stored in the manager card and set outside the tamper resistant device.

The anonymous ID register means 106, the anonymous ID database for management 107, the data link means 109, the database that stores divided personal data 110, the access control server 208, and the personal data using program 204 are the same as those in the system 200.

Figure 12:
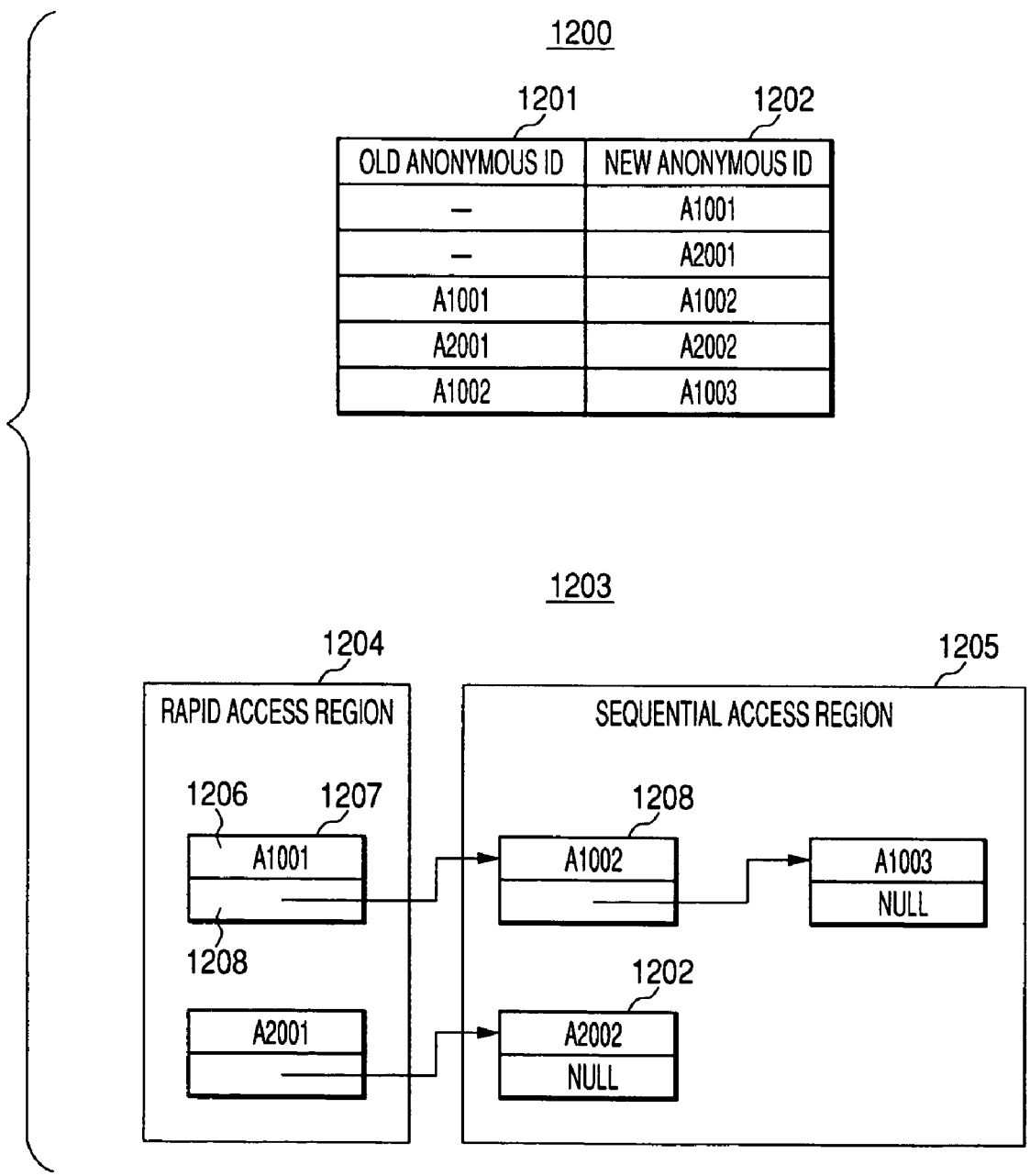
FIG. 12 is a diagram of internal data in the third embodiment.

FIG. 12 shows a data structure used in the system 1100. A table 1200 is stored in the database that stores anonymous ID regeneration history data 1004. Record data in each row represents a regeneration history in one time. A field 1201 represents an anonymous ID before regeneration and a field 1202 represents an anonymous ID after regeneration. In an example of the figure, A1001 represents an anonymous ID first issued to a personal ID "1001". A1002 represents an anonymous ID issued next. The order of records is an order in which regeneration is performed.

In this embodiment, the entire processing is possible if the table 1200 is provided. However, when an extremely large number of records are recorded in the table 1200, processing efficiency of the anonymous ID synchronize means 1001 may cause a practical problem. One approach for avoiding this problem is to cause the anonymous ID synchronize means 1001 to read the table 1200 in advance from the database and develop the table 1200 on a memory in a data structure indicated by 1203. Data included in the table 1200 are divided and held in a rapid access region 1204 and a sequential access region 1205. In a typical example, a data structure excellent in retrieval time cost such as a binary tree and a hash table is given to the rapid access region 1204 and a data structure excellent in memory cost such as a linear list or array is given to the sequential access region 1205.

Figure 13:
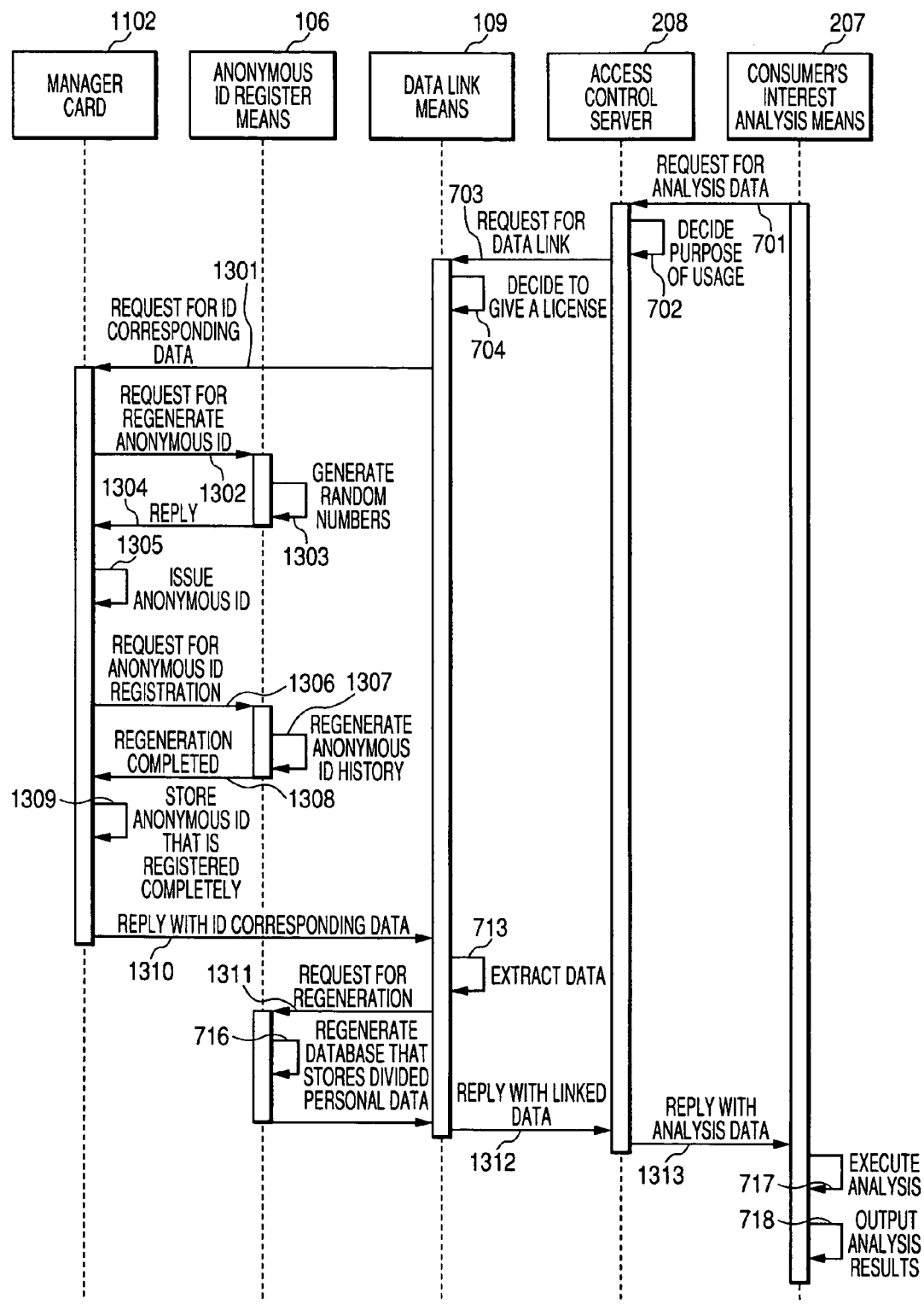
FIG. 13 a diagram of a sequence for representing regeneration of anonymous ID corresponding data and data extraction from a database that stores divided personal data using a manager card.

A sequence 1300 in FIG. 13 shows a flow of processing in which the data 303 managed by a personal ID and the data 304 managed by an anonymous ID in the database that stores divided personal data 110 are linked and the linked data is used in the consumer's interest analysis means 207.

First, the consumer's interest analysis means 207 requests analysis data in the processing 701 and the sequence 1300 is started. The processing 701, the processing 702, the processing 703, and the processing 704 are the same as those in the sequence 700.

Subsequent to the processing 704, the data link means 109 requests the manager card 1102 to send ID corresponding data in processing 1301. The manager card 1102, which has received the request, requests the anonymous ID register means 106 to regenerate an anonymous ID. The anonymous ID register means 106 creates a random number in processing 1303 and sends the random number to the manager card 1102 in processing 1304. In processing 1305, the manager card 1102 executes the same processing as the processing 708 and issues an anonymous ID with the random number and a personal ID as keys. Subsequently, the manager card 1102 sends the issued anonymous ID to the anonymous ID register means 106 in processing 1306. If the anonymous ID does not overlap an existing anonymous ID, the anonymous ID management means 106 registers the received anonymous ID in the database that stores anonymous ID regeneration history data 1004. When the manager card 1102 receives a notice of completion of regeneration from the ID register means 106 in processing 1308, the manager card 1102 stores the issued anonymous ID in the anonymous ID database 103 in processing 1309.

The regeneration processing for an anonymous ID ends here. In processing 1310, the manager card 1102 returns ID corresponding data of the anonymous ID before regeneration and the personal ID to the data link means 109. The ID corresponding data is data storing the anonymous ID and the anonymous ID before regeneration in a data format, which the manager card 1102 can handle, such as one data padded in an array or a group of bit strings. Subsequently, the data link means 109 executes the processing 713 same as that in the sequence 700 and extracts analysis data.

Next, in processing 1311, the data link means 109 requests the anonymous ID register means 106 to regenerate the database that stores divided personal data 110. The anonymous ID register means 106 executes the processing 716 same as that in the sequence 700. The system shifts to processing 1312.

However, depending on a balance of a processing ability of the manager card 1102 and a processing ability of the database that stores divided personal data 110, it may be more excellent in terms of time efficiency not to take any action in response to a regeneration request to temporarily postpone the processing 716 and execute processing for several regeneration requests collectively with some delay. Under the principle of the invention, it is easy to cope with such processing. In this case, in the processing 713, the data link means 109 refers to regeneration history data in the database that stores anonymous ID regeneration history data 1004, creates ID corresponding data for respective anonymous IDs in the past corresponding to a certain personal ID, and performs link processing. In the processing 716, the anonymous ID register means 106 does not take any action until reception requests of a number determined by a system user in advance are received. The system shifts to the next processing 1312. When the number of receipt requests reaches this number, the anonymous ID register means 106 refers to the database that stores anonymous ID regeneration history data 1004, checks an anonymous ID that is still required to be regenerated in the database that stores divided personal data 110, and executes ID regeneration processing. Then, the sequence shifts to the processing 1312.

In the processing 1312, the data link means 109 sends the data extracted in the processing 713 to the access control server 208. Subsequently, the access control server 208 sends the received link data to the consumer's interest analysis means 207 as analysis data requested in the processing 701. Subsequently, the consumer's interest analysis means 207 executes the processing 717 and the processing 718 same as those in the sequence 700 and outputs a result of analysis.

Figure 14:
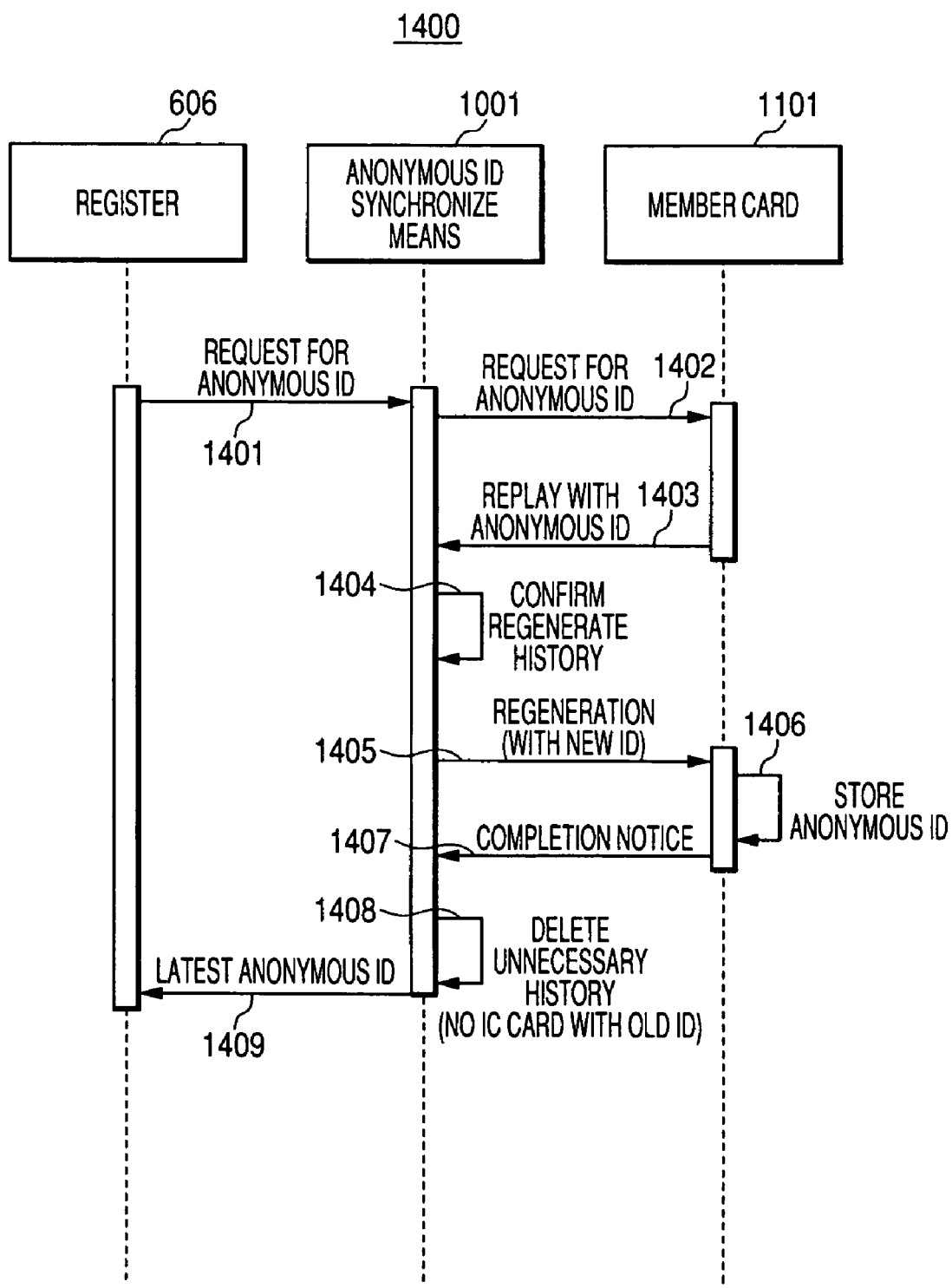
FIG. 14 is a diagram of a sequence in which a member card acquires a replica of an anonymous ID from a server.

FIG. 14 shows a sequence in the case that a member card is used. A sequence 1400 shows processing in which the member card 1101 obtains an anonymous ID replying to the register 606 when a result of purchase using an anonymous ID is recorded as in the sequence 600. In processing 1401, the register 606 requests the anonymous ID synchronize means 1001 to send an anonymous ID. Subsequently, in processing 1402 and processing 1403, the anonymous ID synchronize means 1001 obtains an anonymous ID stored in the member card 1101. In processing 1404, the anonymous ID synchronize means 1001 confirms the data 1203 obtained by developing the table 1200 in the database that stores anonymous ID regeneration history data 1004 on a memory. When the anonymous ID synchronize means 1001 confirms the table 1200 directly, the anonymous ID synchronize means 1001 retrieves and checks a record with the anonymous ID obtained in the processing 1403 as a key. When the data 1203 is used, first, the anonymous ID synchronize means 1001 confirms whether the data 1203 correspond to an old anonymous ID using a rapid access region and, then, confirms a sequential access region to thereby realize the processing.

If a new anonymous ID is present in the database that stores anonymous ID regeneration history data 1004, in processing 1405 and processing 1406, the member card 1101 overwrites and stores the new anonymous ID in the replica anonymous ID database 1003. Subsequently, in processing 1408, the anonymous ID synchronize means 1001 deletes unnecessary history data from the anonymous ID regeneration history data. In processing 1408, the anonymous ID synchronize means 1001 returns a latest anonymous ID to the register 606.

The third embodiment of the invention is as described above. By using the anonymous ID synchronize means 1001 in this way, it is possible to facilitate control of data link as described in the first and the second embodiments while using both a manager card having authority to link data and a member card having a right to copy an anonymous ID.

Note that, in the third embodiment of the invention, it is also easy to obtain the same advantage by encrypting all ID corresponding data and giving the encrypted ID corresponding data to the business data server 1106 in the system 1100. In this case, the manager card 1102 has a common key and the personal ID database 104 and the anonymous ID database 103 are unnecessary. The ID corresponding data response means 1005 in the manager card replies with the common key instead of the ID corresponding data and the anonymous ID issue means 105 is provided in the business data create server 1106. When such a constitution is adopted, in processing 1302, the manager card 1102 passes an encryption key to the anonymous ID register means 106. In processing 1303, the anonymous ID register means 106 decrypts the ID corresponding data and, then, performs a series of processing. In processing 1307, the anonymous ID register means 106 forms a regenerated anonymous ID as new ID corresponding data, encrypts the ID corresponding data with the common key, and then stores the ID corresponding data. In processing 1310, the manager card 1101 replies with the ID corresponding data before regeneration.

It is possible to apply the invention to a database system that handles data with high confidentiality such as electronic personal information, medical information, and official documents.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A method of controlling linkability of a personal database and an anonymity database in a personal data management server, the personal database for storing individual data of a user in accordance with a personal ID as a key, and the anonymity database for storing data of the same user in accordance with an anonymous ID as a key, the personal data management server responding to a request to retrieve data from the personal database by the personal ID as a key; and the personal data management server responding to a request to retrieve data from the anonymity database by the anonymous ID as a key and maintaining the anonymous ID, the method comprising:

the personal data management server, in response to a request for retrieving data of the user from the personal database and the anonymity database by a present said anonymous ID taken as a present anonymous ID serving as a key, inquiring of a client apparatus about a personal ID corresponding to the present anonymous ID of the user, the personal data management server receiving the personal ID corresponding to the present anonymous ID and another anonymous ID for replacing the present anonymous ID from the client apparatus, the personal data management server retrieving data from the personal database according to the receiving personal ID and data from the anonymity database according to the present anonymous ID to respond to the retrieving request by the present anonymous ID as a key, and the personal data management server replacing the present anonymous ID with the another anonymous ID after the responding, so as to keep correspondence between the personal ID and the anonymous ID secret; and wherein the personal data management server includes an anonymous ID management server, wherein the method comprising:

the client apparatus generating and sending the another anonymous ID for the replacing operation, the personal data management server registering the received anonymous ID in the anonymity database if the anonymous ID does not overlap an existing anonymous ID, or not registering the received anonymous ID in the anonymity database if the anonymous ID overlaps an existing anonymous ID, the personal data management server sending a result indication of one of success and failure of the registration, if receiving the indication of success, the client apparatus sending the personal ID to the personal data management server, and if receiving the indication of failure, the client apparatus repeating the generation and sending one more another anonymous ID for the replacing operation and a receipt of the result, the client apparatus generating the anonymous ID by using a hash function that accepts the personal ID and a random number as input data, and the client apparatus generating, if receiving the indication of failure, another random number and the one more another anonymous ID for the replacing operation.

2. A method of controlling data linkability according to claim 1, wherein data in the anonymity database including at least one set condition for permitting data usage for each anonymous ID, the data relating to an anonymous ID in the anonymity database being specified as a condition for the data usage, wherein the method comprising:

the personal data management server receiving a stated purpose of usage with a link request, and the personal data management server inquiring of the client apparatus for the personal ID and the another anonymous ID, if the stated purpose satisfies the condition relating to the present anonymous ID.

3. A method of controlling data linkability according to claim 1, wherein the method comprising:

the personal data management server sending the stated purpose of usage to the client apparatus when inquiring about the personal ID of the user of the client apparatus to the client apparatus using the present anonymous ID, the client apparatus checking whether the stated purpose received is permitted or not for the client apparatus, and the client apparatus responding to the inquiring if the purpose is permitted.

4. A method of controlling data linkability according to claim 2, wherein the method comprising:

the personal data management server receiving the present anonymous ID when coupling to the client apparatus and the personal data management server checking whether the stated purpose of usage is permitted or not.

5. A method of controlling data linkability according to claim 1, wherein the personal data management server includes a plurality of anonymity databases, wherein the method comprising:

the personal data management server receiving, in response to a link request, the personal ID and a plurality of present anonymous IDs and a plurality of anonymous IDs for replacing, the personal data management server responding to the link request based on the personal ID and the plurality of present anonymous IDs, and the personal data management server replacing, after responding, the plurality of present anonymous IDs with the received plurality of anonymous IDs for replacing.

6. A method of controlling data linkability according to claim 1, wherein the method comprising:

the personal data management server accumulating electronic data with the anonymous ID as a key, the electronic data being able to be collated with personal data to identify a specific individual.

7. A method of controlling data linkability in a personal data management server that includes a personal database for storing individual data in accordance with a personal ID as a key, an anonymity database for storing data in accordance with a anonymous ID as a key, a personal ID database, an anonymous ID database, a data response means and an anonymous ID regeneration history database, wherein the method for controlling data linkability comprises:

the personal data management server, in response to a link request to link data having an anonymous ID as a key and individual data having the personal ID as a key, both of the data relating to a user for obtaining a personal ID of the user, inquiring about the personal ID of a user using a present said anonymous ID as a present anonymous ID, the personal data management server retrieving data from the personal database according to the personal ID and data from the anonymity database according to the present anonymous ID, for responding to the link request, the personal data management server replacing the present anonymous ID with another anonymous ID after the response, the personal data management server storing the present anonymous ID and the another anonymous ID as a pair of anonymous IDs, into the anonymous ID regeneration history database, and the personal data management server searching the anonymous ID regeneration history database for retrieving the pair of the anonymous IDs according to an anonymous ID of a client apparatus of the user coupling to the personal data management server, sending the retrieving anonymous ID to the client apparatus, and the client apparatus replacing the stored anonymous ID with received anonymous ID for replacement; and wherein the personal data management server includes an anonymous ID management server, wherein the method comprising:

the client apparatus generating and sending the another anonymous ID for the replacing operation, the personal data management server registering the received anonymous ID in the anonymity database if the anonymous ID does not overlap an existing anonymous ID, or not registering the received anonymous ID in the anonymity database if the anonymous ID overlaps an existing anonymous ID, the personal data management server sending a result indication of one of success and failure of the registration, if receiving the indication of success, the client apparatus sending the personal ID to the personal data management server, and if receiving the indication of failure, the client apparatus repeating the generation and sending one more another anonymous ID for the replacing operation and a receipt of the result, the client apparatus generating the anonymous ID by using a hash function that accepts the personal ID and a random number as input data, and the client apparatus generating, if receiving the indication of failure, another random number and the one more another anonymous ID for the replacing operation.

* * * * *